United States Patent [19]

Boyle, III et al.

[11] Patent Number: 5,717,747

[45] Date of Patent: Feb. 10, 1998

[54] ARRANGEMENT FOR FACILITATING PLUG-AND-PLAY CALL FEATURES

[75] Inventors: Frank J. Boyle, III, Broomfield; Andrew D. Franklin; Jane Gambill, both of Boulder; Charles H. Parker, Broomfield; Dennis R. Sanger, Westminster, all of Colo.

[73] Assignee: Lucent Technologies Inc., Murray Hill, N.J.

[21] Appl. No.: 656,517

[22] Filed: May 31, 1996

[51] Int. Cl.$^6$ .............................. H04M 3/42; H04M 3/00
[52] U.S. Cl. ........................ 379/201; 379/242; 379/269
[58] Field of Search ................................. 379/201, 207, 379/242, 268, 269, 280, 284

[56] References Cited

U.S. PATENT DOCUMENTS

| | | | |
|---|---|---|---|
| 4,695,977 | 9/1987 | Hansen et al. | 364/900 |
| 4,747,127 | 5/1988 | Hansen et al. | 379/94 |
| 4,782,517 | 11/1988 | Bernardis et al. | 379/201 |
| 5,337,351 | 8/1994 | Manabe et al. | 379/201 |
| 5,404,396 | 4/1995 | Brennan | 379/207 X |
| 5,448,631 | 9/1995 | Cain | 379/207 X |
| 5,471,318 | 11/1995 | Ahuja et al. | 358/400 |

OTHER PUBLICATIONS

U. S. Patent Application, S. R. Ahuja 7-2-3-1-1-1-7, Serial No. 08/051724, "Multimedia Telecommunications Network and Service", Filed Apr. 22, 1993.

The AT&T MultiMedia Communications eXchange, Publication No. GBCS–MCS–097P1, 1996 (4 pages).

D. A. Berkley, et al., *Multimedia Research Platforms*, AT&T Technical Journal, Sep./Oct., vol. 74, No. 5, pp. 34–53.

J. O. Coplien, *Ishmael: An Integrated Software/Hardware Maintenance and Evolution Environment*, AT&T Technical Journal, Jan./Feb. 1991, vol. 70, No. 1, pp. 52–63.

*Communique! InSoft$_R$ Desktop Conferencing and Workgroup Collaboration User's Guide*, Version 4 for use with the Motif Window Manager, Apr. 6, 1995, pp. 9, 17–43.

InSoft Brochure: *InSoft$^R$ Digital Video Everywhere, DVE*, (2 pages), 1994.

InSoft Brochure: *InSoft$^R$ Open DVE$^{tm}$*, (2 pages), 1994.

InSoft Brochure: *Turn Your Desktop Into A Global Conference Room*, InSoft$^R$, (2 pages), (undated).

(List continued on next page.)

Primary Examiner—Harry S. Hong
Attorney, Agent, or Firm—David Volejnicek

[57] ABSTRACT

A telecommunications system infrastructure that facilitates easy insertion of feature software into existing such telecommunications systems and easy integration of the new calling features and their implementing software with existing features and their software. The infrastructure comprises the Lucent Technologies MMCX multimedia communications server (100) and middleware-compliant communications endpoints (101–102) executing the Lucent Technologies MMCX communications middleware (111–112). Feature-implementing software has a modular client/server construction, with feature managers (server modules, 300, 350) executing on the MMCX server and feature administration agents (client modules, 303–353, 304–354) executing on the endpoints. The infrastructure provides a context service (120) and a context API (121) for registering an instance of a feature manager (a user policy, 301–302, 351–352) for each user upon that user becoming entitled to the feature, an administration API (360) for communications between feature managers and feature administration agents on the user's endpoint to customize the user's user policies for the user, and a context (a cyberspace meeting room, 200) and the context API for involving the user policies of users who are parties to a call in the call and for communicating call-related events to feature servers and other service-implementing software. Call-related events are passed to user policies involved in the call, and they are given a chance to react to the events by allowing or rejecting the events. Interactions between features are managed by having feature managers register at different priorities with the context service; higher-priority modules are serially given an opportunity to allow or reject events before lower-priority modules.

10 Claims, 5 Drawing Sheets

OTHER PUBLICATIONS

InSoft Brochure: *Collaborative Features that Make the Difference*, InSoft[R], (2 pages), (undated).

C. Petzold, *Programming Windows 3.1*, Redmond: Microsoft Press, 1992, pp. 10–15, 34–39.

*Understanding TAO*, Computer Telephony, vol. 4, Iss. 2, Feb. 1996, pp. 141–162.

E. Margulies, *More Computer Telephony Architecture, Anyone?*, Computer Telephony, vol. 4, Iss. 3, Mar. 1996, pp. 228–230.

R. Grigonis, *The Origin of LAN Call–Control APIS*, Computer Telephony, Apr. 1995, pp. 102–105.

R. Grigonis, *Novell Netware Telephony Services*, Computer Telephony, Apr. 1995, pp. 83–84.

H. Newton, *The Firestorm Behind Mitel's "Open" PBX in a PC*, Computer Telephony, vol. 4, Iss. 1, Jan. 1996, pp. 10–22.

ARRANGEMENT FOR FACILITATING PLUG-AND-PLAY CALL FEATURES

TECHNICAL FIELD

This invention relates to stored-program-controlled communications systems, including multimedia communications systems.

BACKGROUND OF THE INVENTION

Traditionally, adding calling features to switching-system (e.g., central office or PBX) control software has required modifying existing feature programs while paying careful attention to interactions between existing features and the new features. For example, implementing call-center features on a PBX that already provides call-forwarding and call-coverage requires careful coordination between the two sets of features, ensuring that calls are handled correctly when a call-center agent enables call-forwarding or call-coverage. In a multimedia telecommunicaions system where users are presented with graphical user interfaces, the need to provide new user interfaces to control new features poses an additional problem: in order for the endpoint user-interface and the server feature-software to communicate, the endpoint-to-server protocol generally needs to be updated.

The above-mentioned constraints present an imposing barrier to developers who are responsible for continuing maintenance and upgrades of the features. These constraints present an even-more imposing barrier to the development by third-party vendors of new features or of new versions of existing features. Third parties generally have neither the interest nor the capability to modify the telecommunications system software in order to make their feature software fully compatible therewith. Consequently, the telecommunications system owner is dependent exclusively on the system manufacturer for the feature set and feature upgrades of the system.

SUMMARY OF THE INVENTION

This invention is directed to solving these and other problems and disadvantages of the prior art. Generally according to the invention, there is provided a telecommunications system infrastructure that facilitates easy insertion of feature software into an existing said telecommunications system, and easy integration of the new calling features and their implementing software with existing features and their software.

Specifically according to one aspect of the invention, a call-control apparatus that executes feature-implementing software, wherein each call feature is implemented as a server program and a cooperating client program, has the following elements. An arrangement (illustratively a context service) for registering for a user an instance (illustratively a user policy) of a server program that implements any call feature, in a same manner as any other instances of any server programs that implement any call features, substantially at any time during operation of the call-control apparatus to provide the call feature for the user. In other words, the registration mechanism is identical for all feature-implementing programs, and operates dynamically. An administration interface (illustratively an application program interface, or API) for communicating information between the server program and a cooperating said client program used by the user, in a same manner as between any other client programs and any server programs that implement any call features, to customize the instance of the server program for the user. In other words, the administration interface is identical for all feature-implementing programs. An arrangement (illustratively a context, which is a cyberspace meeting room, along with the context service) for involving the instance of the server program in a call to which the user is a party, in a same manner as any other instance of any server programs that implement any call features, to provide the feature to the call. In other words, the mechanism for involving feature-implementing programs in calls is also identical for all features.

The above-characterized call-control apparatus provides all the interaction that is needed between feature-implementing programs as well as between feature-implementing programs and other service-implementing programs. Consequently, substantially any feature-implementing program that complies with the registration and conforms with the administration and in-call-involvement communications schemes may be added to and used in the apparatus; the call-control apparatus automatically effects integration of any such new feature-implementing program into the existing environment.

Preferably, interactions between feature-implementing programs are managed efficiently by having priorities associated with the individual programs. Each instance of each server program has a priority associated therewith, and the arrangement for involving feature-implementing programs in calls includes an arrangement (illustratively a context service and its context API) that responds to occurrence of a request for service (referred to herein as "an event") in the call by giving instances of server programs that are involved in the call each a chance to respond to the event in an order of their associated priorities. In other words, higher-priority programs are given an opportunity to approve or reject events before lower-priority programs. The system designer, administrator, or users are allowed to change the relative priorities of the feature-implementing programs and thereby control how features interact with each other. For example, it allows the administrator to specify whether call coverage is invoked for a call before call forwarding, or vice versa.

Preferably, the arrangement for involving feature-implementing programs in calls includes a second interface (illustratively also an API, referred to herein as the context API) for communicating events between a plurality of server programs that are involved in the call, in a same manner as between server programs that are involved in any other calls. In other words, the second communications interface is also identical for all feature-implementing programs. The arrangement responds to receipt through the second interface of a proposal of an event from a first server program—illustratively the originator of the proposed event—that is involved in a call by sending a request for approval of the event through the second interface to the first server program and also to other (at least one) second server programs that are also involved in the call. The arrangement then responds to receipt through the second interface of approval of the event from both the first and the second server programs by sending notice of the approval of the event through the second interface to both the first and the second server programs—and preferably to all server programs that are involved in the call—to cause the event to be effected. The arrangement preferably further responds to receipt through the second interface means of rejection of the event from either the first or the second server program by forbearing from sending an approval of the event to both the first and the second server programs to prevent the event from being effected, and preferably also sends the rejection through the second interface to the first server program to abort the event.

Specifically according to another aspect of the invention, a method of controlling calls in an apparatus wherein each call feature is implemented as a server program and a cooperating client program and which executes the client and the server programs, comprises the following steps. In response to a user becoming entitled to a call feature, an instance of the server program that implements the call feature is registered for the user, in a same manner as any other instance of any server programs that implement any call features, substantially at any time during operation of the apparatus, to provide the call feature for the user. Then in response to the user using the client program, information is communicated between the server program and the client program through an administration interface, in a same manner as information is communicated through the administration interface between any other client programs and any server programs that implement any call feature, to customize the instance of the server program for the user. Then in response to the user becoming a party to a call, the instance of the server program is involved in the call, in a same manner as any other instance of any server programs that implement any call features, to provide the feature to the call. Plug-and-play feature capability is thereby effected for feature-implementing software.

These and other advantages and features of the present invention will become more apparent from the following description of an illustrative embodiment of the invention taken together with the drawing.

DETAILED DESCRIPTION

Figure 1:
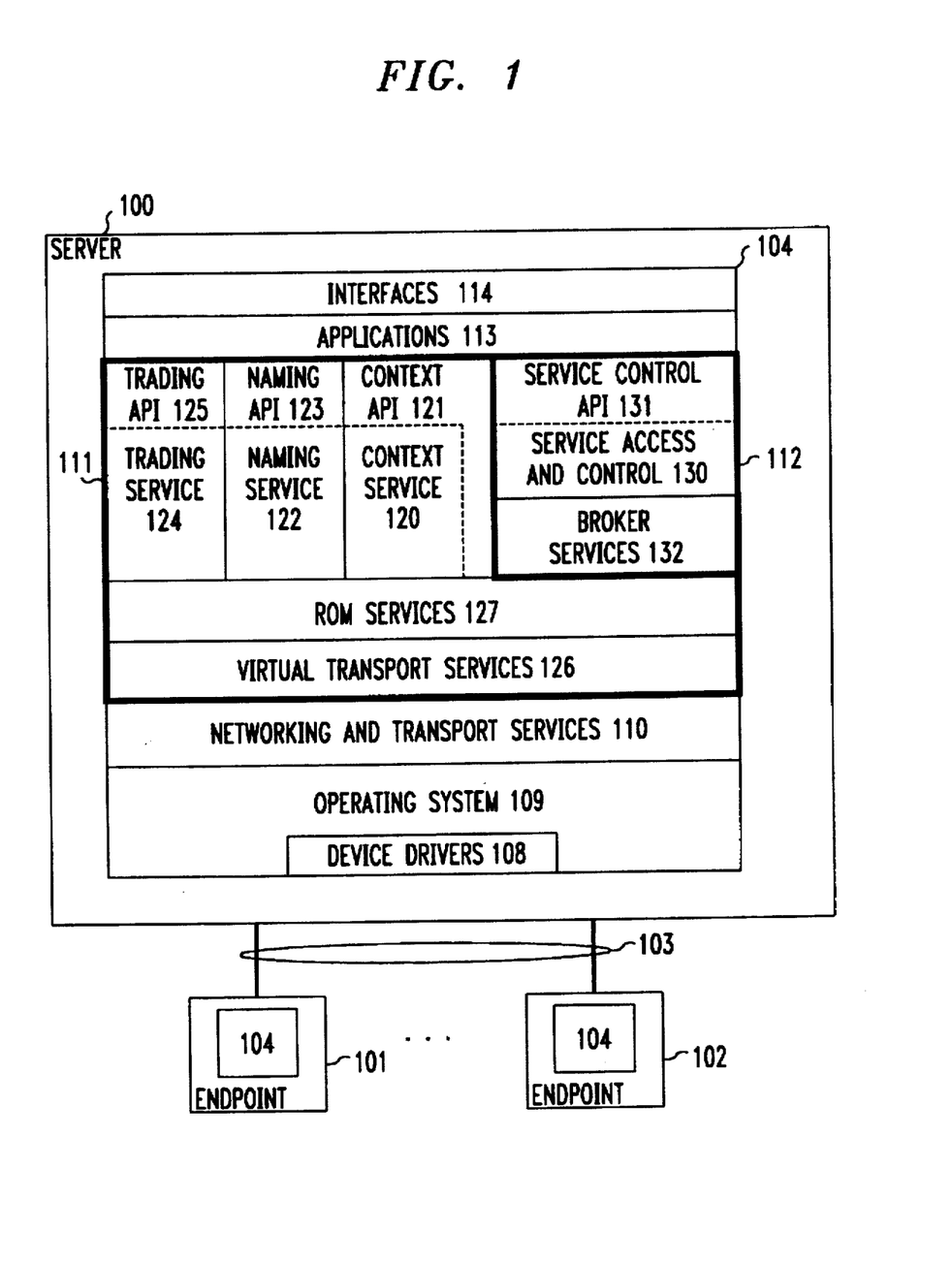
FIG. 1 is a block diagram of an illustrative multimedia communications system.

FIG. 1 shows one possible architecture of a multimedia communications system. The system comprises a plurality of communications endpoints 101–102 connected by communications links 103 with a communications server 100. The system of FIG. 1 can be, for example, a telephone system where server 100 comprises a multimedia-enabled switching system such as a Lucent Technologies Definity® G3 PBX, endpoints 101–102 comprise video workstations such as the NCR Vistium® stations, and links 103 comprise high-bandwidth telephone lines such as ISDN BRI lines. However, in this illustrative example, server 100 is assumed to be a multimedia-services server such as the Lucent Technologies Inc. MMCX multimedia communications exchange, endpoints 101–102 are assumed to be multimedia (including video) workstations, and links 103 are assumed to be a local-area network (LAN) or a wide-area network (WAN). Server 100 and endpoints 101–102 are stored-program-controlled entities. As such, each includes a memory for storing control software, a processor for executing the stored control programs, and input and output interfaces to the outside world, as is well known and understood in the art.

According to well-known software-system design principles, the control software 104 of server 100 and endpoints 101–102 is organized in a multi-layer hierarchy. At the lowest level in the software hierarchy, the control software of server 100 and endpoints 101–102 in this illustrative example comprises a conventional operating system 109—such as the Lynx® operating system—that includes conventional device drivers 108. Next in the hierarchy is a conventional networking and transport services layer 110—such as the Transmission Control Protocol/Internet Protocol (TCP/IP)—which provides the information-movement (i.e., control-signal and information-signal transmission) services between server 100 and endpoints 101–102. Built on top of layer 110 is a middleware layer 111. Middleware is a term for a software platform that provides network-transparent support for the development and implementation of network-based distributed-system applications (e.g., communications services). It is both an applications-development tool and a run-time environment. It provides a distributed object-based computing infrastructure including distributed object life-cycle management, network abstraction, and operating-system and transport-service virtualization. It therefore allows communications applications to be written independently of the resident operating system, the network transport, the interworking algorithms, etc. It also supports a middleware services layer 112 which provides common services that support various communications applications, such as services for session management, routing, event collection, service location, etc. Implemented on top of layers 111 and 112 are applications 113, e.g., specific communications services programs. Applications 113 communicate with layers 111 and 112 by means of application program interfaces (APIs) of layers 111 and 112, and communicate with users and/or administrators via interfaces defined by an interfaces layer 114. In the case of endpoints 101–102, applications 113 illustratively comprise a version of Insoft's Communique!™ collaboration software.

Layers 111 and 112 illustratively comprise the communications middleware software of the Lucent Technologies Inc. MMCX, heretofore known as CoMMware. Layer 111 comprises the middleware platform, while layer 112 comprises middleware-compliant service components that make use of the middleware platform primitives to control calls and their different-media components and to supply calling features (like call-coverage and call-forwarding, for example.) The service components include service managers (servers) and service agents (clients).

The middleware platform provides an infrastructure for bringing parties and multimedia services into communications "contexts" which provide bases for negotiation of service parameters. Each communications session (e.g., a multimedia call) is represented by its own context. The architecture provides support for customizable service negotiation and control software, called "policies", that allows application and service developers to meet a wide variety of product-and service-specific needs.

In the model of communications that is presented by the middleware, all communications take place within a context, and parties and services are associated with one another as members within the context by a context service. The context service is somewhat analogous to Microsoft Corporation's Windows™ system. Just as the Windows system distributes events that reflect a change in the applications' presentation environment to all applications running in that environment, so does the context service distribute events which reflect a change in the communications context to all members of that context. In addition to the event-notification mechanism, the context service also supports message-passing among context members, for example, to enable negotiation of interworking parameters between endpoints and servers with possibly-disparate capabilities.

The middleware effectively provides a signaling overlay on top of the underlying network architecture, which overlay supports multiparty, end-to-end negotiation that facilitates the design of interoperable multimedia communications products and services. Middleware concepts of context, virtual transport, and trading aid in the provisioning of multiparty, multimedia distributed communications in heterogeneous environments.

Figure 2:
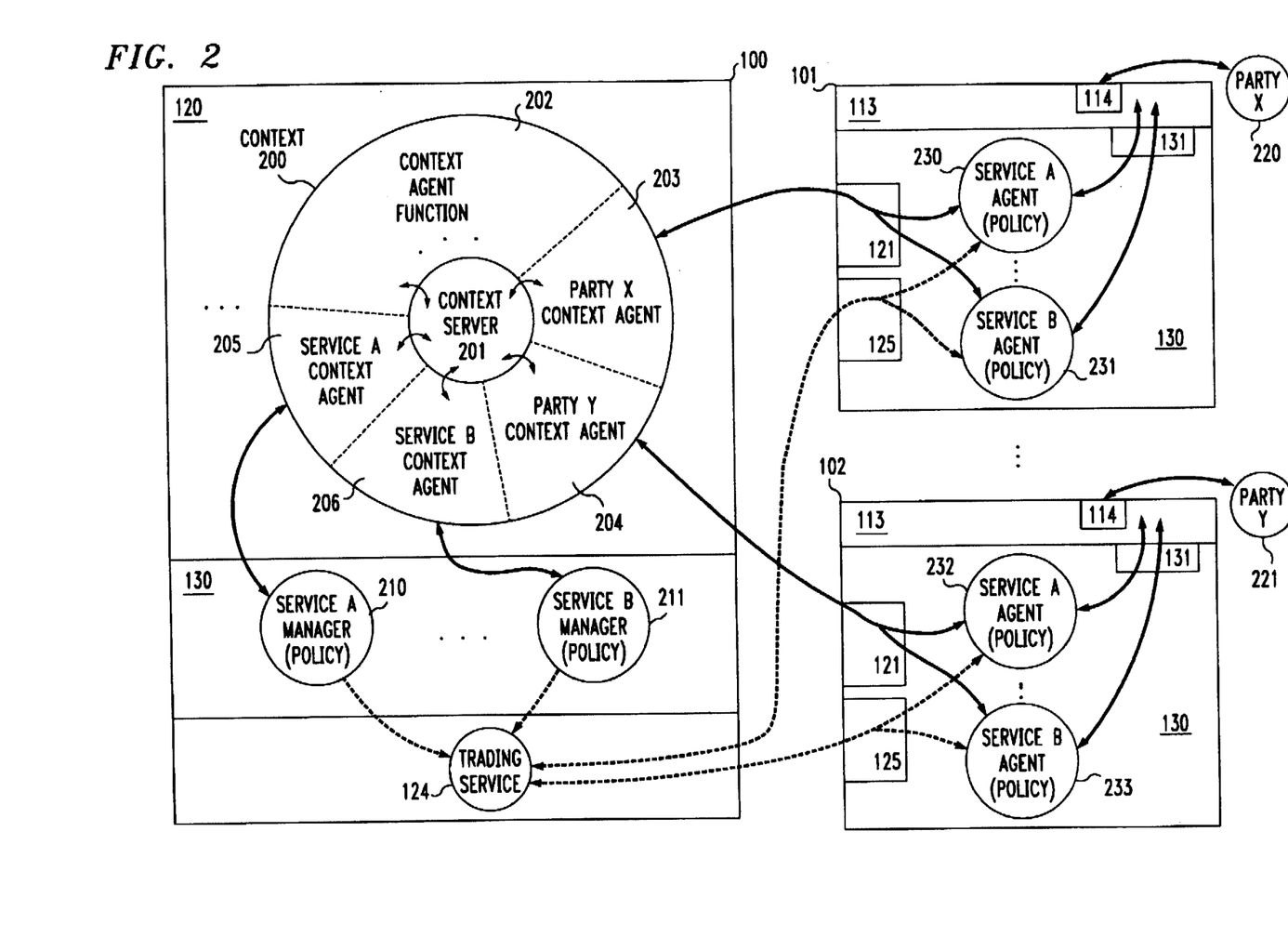
FIG. 2 is a block diagram of a call-service model implemented by the system of FIG. 1.

The model of communications that is presented by the middleware is shown in FIG. 2. The middleware facilitates bringing parties and services together in a "cyberplace", which is referred to as context 200. A context server 201 manages context 200 to/from which may be added/dropped the context members. Members may be parties and services. A logged-in user of an endpoint 101–102 who is a member of a context is referred to as a party (220–221) to that context. A service is represented in a context 200 by its service manager 210–211. Parties and services are treated identically by context server 201, and are referred to simply as "members". All members in a context 200 are represented by a context agent facility 202. Each member of context 200 is logically represented in context agent facility 202 by its own corresponding member context agent 203–206 (e.g., its own virtual port on context agent facility 202). When context 200 changes as a result of members being added to or dropped from the context, context server 201 alerts all members' context agents 203–206, which in turn notify their corresponding members. When a new member joins an existing context 200, all members already in the context are similarly notified, and each has a chance to exchange some initial "get acquainted" messages with the new member and with other members that were already in the context. In middleware, this is called "negotiation", since it is generally used to achieve a common ground for communications between the members (parties and services) in the context.

The middleware provides support for brokering in three ways. First, the middleware includes trading service 124, which is a database system that can be used to locate services based on service characteristics. Services are constructed in a client/server configuration, with programs that actually provide the services, called service managers 210–211 (also call services, service components, resource or media servers, or resource or media managers), being located in MMCX server 100, and programs that obtain the services from service managers 210–211 on behalf of applications in endpoints 101–102, called service agents 230–233 (also called service clients, or resource or media agents), being located in endpoints 101–102. Service managers 210–211 can register with trading service 124, giving their service attributes and capabilities. Trading service 124 provides a query capability to enable service agents 230–233 to obtain identities of services (i.e., of service managers 210–211) that can meet the common needs of the parties in a context. Secondly, specialized brokering services 132 can be written, which are servers themselves that can be brought into a context. A brokering service uses the generic negotiation mechanism provided by the middleware to gather the service-related attributes of the parties in the context, enabling it to bring other service managers 210–211 into the context that can meet their, perhaps diverse, needs. And finally, the middleware supports the development of implicit brokers which, as policies of context server 201, can examine the attributes of the context and its members to bring services into the context. This sort of broker might be used, for example, to bring billing services into the context. These brokering mechanisms can also be used in unison. A specialized broker may, for example, gather parties' attributes and formulate a complex query to trading service 124 to locate the right service.

The middleware provides a framework for introducing a level of signalling and control for communications sessions that fits logically above the transport network. This means that software can be written to formalize communications that are required to set up calls. The middleware supports codification of the signalling used for service composition and separates it from that used for control of bearer channels and network connections. A member context agent 203–206 of context agent facility 202 utilizes virtual transport to access underlying transport services for establishing a signalling connection to a context server 201, which, in turn, is then able to establish signalling connections with other member context agents 203–206. Context agent facility 202 utilizes a transaction protocol with context server 201 to create a context 200 for a communications session and to associate parties 220–221 and service managers 210–211 with the context. Integral to this transaction protocol, the middleware provides a foundation for negotiation among parties' service agents 230–233 and service managers 210–211 which allows media-specific service agents 230–233 and service managers 210–211 to agree on service-specific parameters regarding the communications session. The specific negotiation protocol, as defined in common for a specific media service, is implemented in replaceable program entities (policies) which are bound to context transaction processing.

While the communications model supports familiar communication system features (with parties and transport), more elaborate communications in which multiple parties and a rich array of services are added and removed dynamically are also supported naturally within the model. For example, a two-party voice call can be turned into a multiparty conference with a video and a multipoint shared application by adding additional parties, a video-connection service, and a shared-data service to the context. Further, since the services in a context may be independent of one another, each can be added and removed at any time without affecting the others. These attributes of the model result from the concept of context and the fact that the signalling for bearer-channel connection-control and for establishment and control of the context are separate.

A second example illustrates additional attributes of this model. If an interactive service (such as "800"-number video-catalog shopping) were desired, an endpoint would be able to request the service and negotiate the attributes of the service to conform to its own capabilities. But then, the service itself could request that required ancillary services be added to the context, such as billing, order processing, and credit card authorization. This illustrates the fundamental symmetry of the middleware architecture that provides parties and services with the same status in a context, thus allowing all members the full power of the context transaction protocol.

As shown in FIG. 1, the middleware is constructed as follows. There are six architectural elements to the middleware platform:

Context service 120: The context service provides the supporting mechanisms for the middleware model of communications that provides a context for a communications session in which service providers and service users are treated as undifferentiated members with equal privileges and capabilities. Context service 120 is provided by interactions between a context server 201 that manages a context 200 and a context agent 202 that represents the members of the context. Communications with context service 120 are effected through a context API 121. Context API 121 is available to both applications software and service modules. This means that, although policy modules will normally buffer applications from context transactions, negotiation, and service control, it is possible for applications to directly react to and influence these activities.

Naming service 122: A distributed naming database that allows the middleware and middleware-based applications to access transport addresses associated with a middleware identifier (CWID). Each service manager 210–211 and party 220–221 has its own CWID. The naming service performs two mappings: 1) a mapping from a CWID to a transport-independent address (a virtual transport address, or VTA), and (2) a mapping from a VTA to transport-dependent addresses and attributes. The attributes associated with each VTA illustratively consist of "attribute name; attribute value" pairs, where there is a fixed set of attribute names supported. Service agents 230–233 use the first mapping to get the VTA for a given party or service manager and then give the resulting VTA to virtual transport service 126, which calls on naming service 122 to perform the second mapping in order to obtain actual transport addresses for establishing transport connections to these parties and service managers. Communications with naming service 122 are effected through a naming API 123.

Trading service 124: Trading in the middleware is service selection based on combined attributes of the members of a context. Trading service 124 is a database that supports service registration and the ability to locate service managers 210–211 by required attributes. Trading service 124 has the ability to satisfy queries from service agents 230–233 that require it to find the "best match" of party attributes to service attributes. Service managers register with the trading database. Brokers can be developed in the middleware that use trading service 124 to find a best match for the collective needs of the members of a context. Communications with trading service 124 are effected through a trading API 125.

Remote object management (ROM) service 127: The ROM service is a simple object request broker (in the object-oriented programming sense). It uses virtual transport service 126 to allow object methods to be invoked remotely. ROM service 127 is available to both the middleware itself and to applications and policy modules. Policy modules may make use of ROM service 127 to establish out-of-context communications channels with peer or server policy modules. Applications make use of ROM service 127 to establish client-server connections.

Virtual transport service 126: An abstraction of transport that presents a common model for a variety of communications networks. The use of virtual transport enhances the portability of applications and services and their interoperability in heterogeneous network environments. Each entity in the middleware is given a virtual transport address (VTA) which allows addressing of and connecting to that entity in a network-independent manner.

In addition to these elemental services, the middleware provides a programming framework and associated libraries to facilitate development of run-time libraries that implement protocols for middleware-compliant service access and control 130 and brokering services 132. The program entities that are developed within this framework are objects (in the object-oriented programming sense), called policy modules or policies, that implement service and access control 130 and brokering services 132, and constitute the client/server software that provides services and service access. In other words, service managers 210–211 and service agents 230–233 are policies that perform the service-specific negotiation and control functions that are required for service delivery.

To control independently a dynamic mixture of services, the concept of context provides a place to instantiate a locus of control for the composition of these services and facilitates the multi-way negotiation needed to deliver the services to a variety of endpoints. This requires that the detailed attributes of various media services (feature control mechanisms, encoding choices, transport requirements, delay and synchronization characteristics, etc.) be understood and agreed-to by service providers (service managers 110–112) and service users (parties 220–221).

The middleware introduces the idea of "negotiation" among members, typically between parties and service managers, to allow services to be provided in a manner that ensures compatibility and consistency of service delivery to the parties. The middleware provides a framework for incorporating policy modules into a system that are available for use by applications for performing service-specific negotiation in reaction to changes to the context. Policy modules can also be used during service delivery to provide service-control functions, e.g., to tell a video server which video stream to send. Policy modules are essentially service-specific run-time libraries that implement service-specific negotiation and control protocols. Communications by applications 113 with policy modules of service access and control 130 are effected through a service control API 131.

Context service 120 with appropriate policy modules enables deployment of new multimedia services without having to enhance underlying network equipment. Naming service 122 and trading service 124 also facilitate service composition by enabling applications to locate the services that are needed to meet the needs of the members in a context. Brokering services 132 can be created that perform the function of gathering up appropriate party attributes, formulating the required trader query, and inviting the returned service manager into the context. These brokers generally are service-type specific (e.g., audio, video, shared application), and are implemented as separate services that can be added to a context. Broker agents work with the brokering server to locate the needed service manager and add it to the context. In some cases, a broker may be implemented as a policy module of context server 201 which, by virtue of its ability to eavesdrop on all context transactions, can perform a service-location function. Naming service 122 complements the brokering service by providing a facility for converting a middleware entity name to the transport network attributes required to connect to that entity.

Naming service 122 serves both applications 113 and virtual transport service 126. Applications typically use naming service 122 to map a qualified CWID (e.g., an E.164-conformant address, such as a phone number) into a virtual transport address (VTA, e.g., also an E.164-conformant address). The VTA appended with a logical-port identifier is "handed" to virtual transport service 126 which uses naming service 122, once again, to map the qualified VTA to transport-specific attributes. For example, say that a user has a CWID of 303.538.4071, then naming service 122 would be used by a context server 201 to map 303.538.4071.context_port to the VTA of that user's member context agent, which might be 303.538.4000. When the context server 201 wishes to establish a connection to the context agent's port for accepting context messages, it asks virtual transport service 126 to establish a connection to 303.538.4000.context_port. Virtual transport service 126 would, in turn, use naming service 122 to map 303.538.4000.context_port to the transport specific address (es) of the appropriate virtual port on context agent 202.

This description of the middleware applies fundamentally to both MMCX server 100 and endpoints 101–102, although APIs 121, 123, and 125 are the only portions of services 120, 122, and 124 that are used on endpoints 101–102. A distributed client/server architecture is utilized whereby client software (service agents 230–233) in an endpoint 101–102 works cooperatively with server software (service managers 210–211) in server 100 to provide the brokering services as well as the media-control services which provide the value-added communications services to users.

Figure 3:
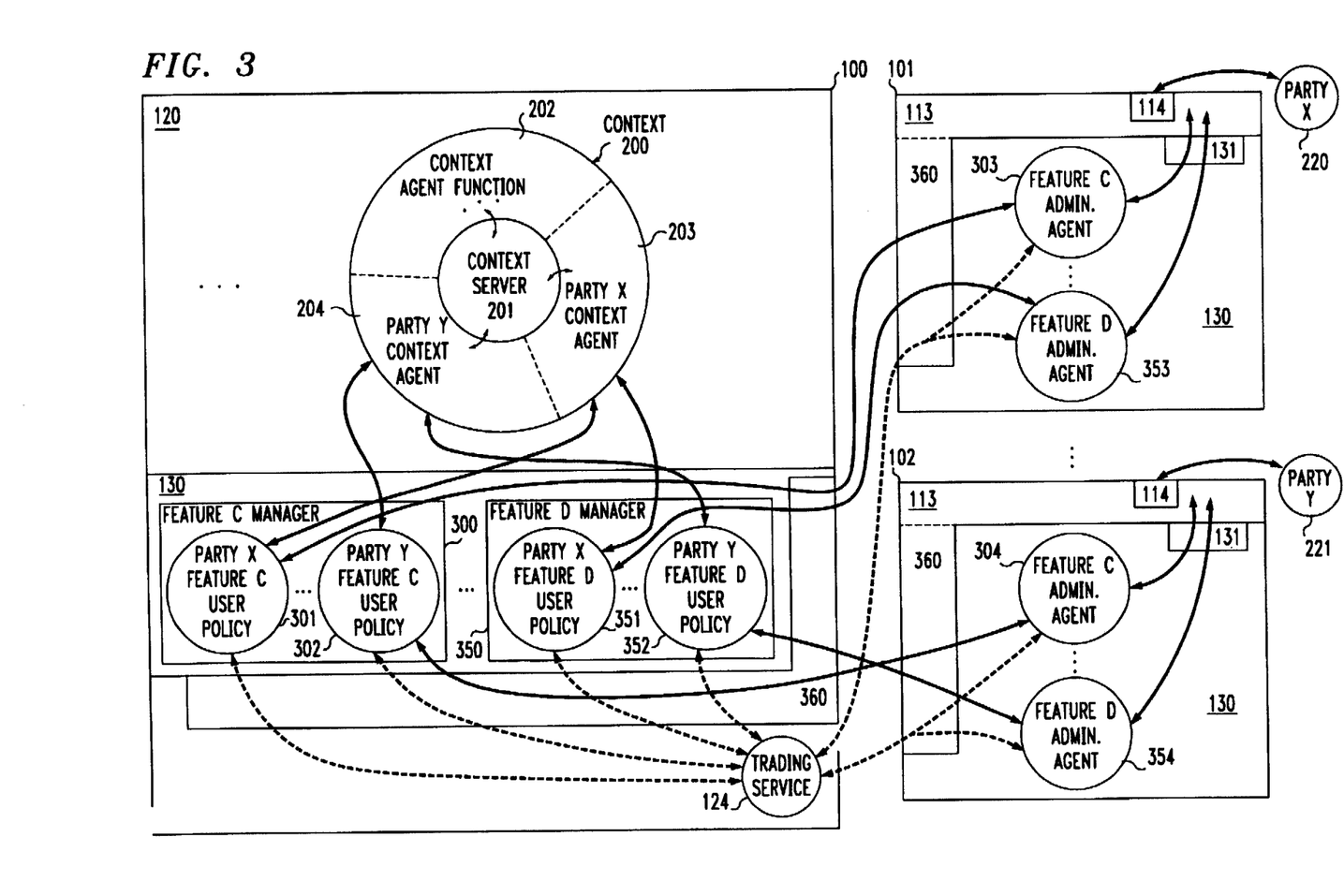
FIG. 3 is a block diagram of a call-feature model implemented by the system of FIG. 1, which embodies an illustrative implementation of the invention.

According to the invention, the above-described infrastructure and call model are used to provide support for plug-and-play call features in the manner illustrated in FIG. 3.

Feature software is implemented using the client/server architecture. As shown in FIG. 3, each feature comprises a feature manager (a server module) 300, 350 on MMCX server 100 and a plurality of feature administration (admin.) agents (client modules) 303–304, 353–354, one on each endpoint 101–102. Each feature manager 300, 350 is implemented as one or more user policies 301–302, 351–352, one for each user 220–221 that is entitled to use the feature. Each user policy 301–302, 351–352 is one user's customized instance of the feature manager 300, 350, respectively. Feature managers 300, 350 and their user policies that are involved in a call are not members of that call's context 200, but each communicates with context 200 through the party context agent 203, 204 of its corresponding party 201, 202. User policies of the same and of different feature managers 300, 350 keep track of each other through the event-notification mechanisms provided by context service 120, but they generally do not communicate with each other directly through an out-of-context exchange of messages.

Unlike the feature managers, feature admin. agents 303–304, 353–354 are not implemented as policies. Feature admin. agents do not execute features, but rather only turn features on and off at endpoints 101–102 and communicate administrative information between parties 220–221 and feature managers 300, 350. Feature admin. agents and their corresponding feature managers communicate with each other outside of context 200 through an administration API 360 that is implemented at the applications layer 113. Administration API 360 uses trading API 125 and ROM service 127 to locate, and to communicate with, feature managers 300, 350. Graphical user interfaces 114 and feature admin. agents for any number of features can be added to (or deleted from) any endpoint 101–102 at any time, and administration API 360 enables the interfaces and agents to locate, and to communicate with, the corresponding feature managers.

Figure 4:
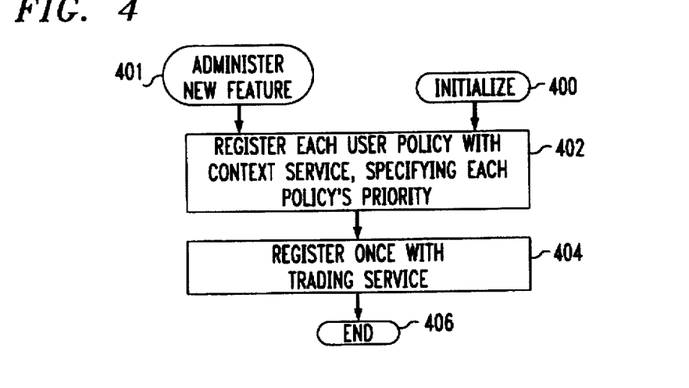
FIGS. 4 and 5 are functional flow diagrams of registration procedures of feature managers and their user policies of the model of FIG. 3.

In order to make context service 120 aware of their existence, the user policies of feature managers 300, 350 must register with context service 120. The registration procedure is shown in FIGS. 4 and 5. Upon its own creation by an administrator of MMCX server 100, at step 401 of FIG. 4, or upon initialization of MMCX server 100 (whichever is earlier), at step 400, a feature manager 300, 350 registers separately each of its user policies 301–302, 351–352 with context service 120 of MMCX server 100, at step 402. As part of each registration with context service 120, a feature manager 300, 350 specifies the priority that has been administered for each user policy. The priorities for all user policies of a feature manager may be all the same, or they may be different. When the priority of one or more of its user policies is administratively changed, the feature manager re-registers with context service 120 with the new priorities. A feature manager 300, 350 also registers once with trading service 124 of MMCX server 100, at step 404, before concluding registration, at step 406.

Figure 5:
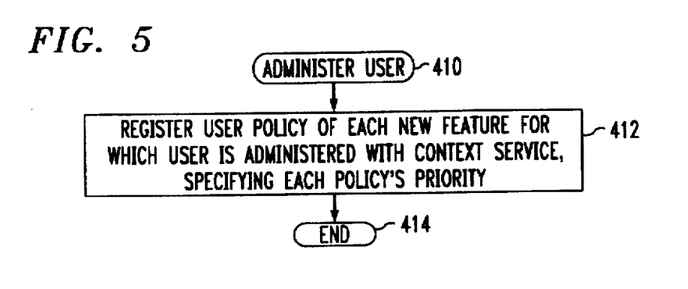

Subsequently, at any time whenever a new user is administered for features or an existing user is administered for a new feature, at step 410 of FIG. 5, each feature manager 300, 350 of the user's new features registers the user's new user policies 301–302, 351–352 with context service 120 of MMCX server, at step 412. As part of the user policies' registration with context service 120, each feature manager 300, 350 specifies the priority that has been administered for the new user policy. Registration of the new user policies then concludes, at step 414.

Figure 6:
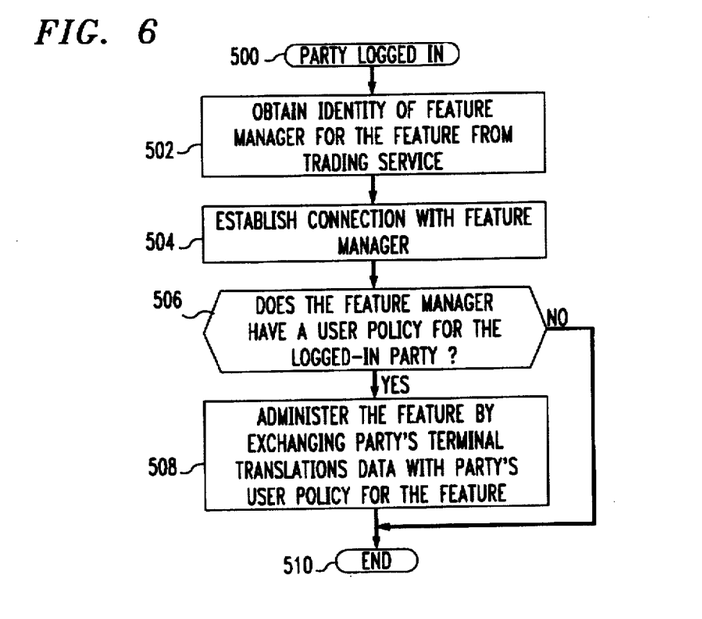
FIG. 6 is a functional flow diagram of a feature administration procedure of a feature administration agent of the model of FIG. 3.

FIG. 6 shows the feature-administration procedure for feature admin. agents 303–304, 353–354. When a party 220, 221 logs into an endpoint 101, 102, at step 500, each feature's feature admin. agent of the logged-into endpoint uses trading service 124 to find the identity of the corresponding feature manager 300, 350 for the corresponding feature, at step 502. The feature admin. agent then uses the identity to establish a communications connection with the corresponding feature manager via administration API 360, at step 504, and determines from the feature manager whether there is a corresponding user policy for the logged-in party 220, 221, at step 506. If there is not a user's policy for the logged-in party, the logged-in party is not authorized to use the corresponding feature, and so the feature admin. agent ends feature administration, at step 510. If a corresponding user policy is found and its identifier is returned by feature manager 300, 350 to the feature admin. agent, the logged-in party is authorized to use the corresponding feature, and so the feature admin. agent and the party's user policy then administer the feature for the party by exchanging that party's "terminal translations" data (as that term is commonly used in the telephony art), at step 508, before ending administration, at step 510. The terminal translations data that is provided by the party's user policy will have been pre-administered by an administrator of server 100, while the terminal translations data that is provided by the feature admin. agent is obtained by feature admin. agent through interaction with the logged-in party through the feature's corresponding one of the interfaces 114 on the endpoint.

Consider, for example, the administration for the call-forwarding feature. The call-forwarding user interface on the endpoint invokes the feature administration API 360, passing it the call-forwarding feature identifier, the identifier of the user who is administering call-forwarding, and a collection of call-forwarding administration data, including the identifier of the forwarded-to party and whether call-forwarding should become enabled or disabled. The feature administration API 360 queries trading service 124 for the identifier of the feature server that matches the call-forwarding feature identifier, i.e., the call-forwarding feature server. If trading service 124 successfully returns this identifier, the administration API 360 sends the call-forwarding feature server the user's identifier and the call-forwarding administration data. The call-forwarding feature server receives the data and stores it in its feature translation database. Henceforth, during call processing, the administration data can be retrieved from the feature translation database and used to effect the call-forwarding feature.

For purposes of event-negotiation, event context 200 provides for three types of inter-member communications: proposals from initiators of events to context, event requests for approval from context to interested policies (those affected by the event), and event notifications from context to all context members. Any proposed event that causes a change in context or a change of state of a context member must be approved by the policies of the acting context member and the policies of the members being acted on. For example, a request to create a context is an event that must be approved by all policies of the requestor; a request to add or delete a member to or from a context or to change a member's state is an event that must be approved by all policies of the requestor and the subject of the request; and a request to destroy a context is an event that must be approved by all policies of the requestor.

Figure 7:
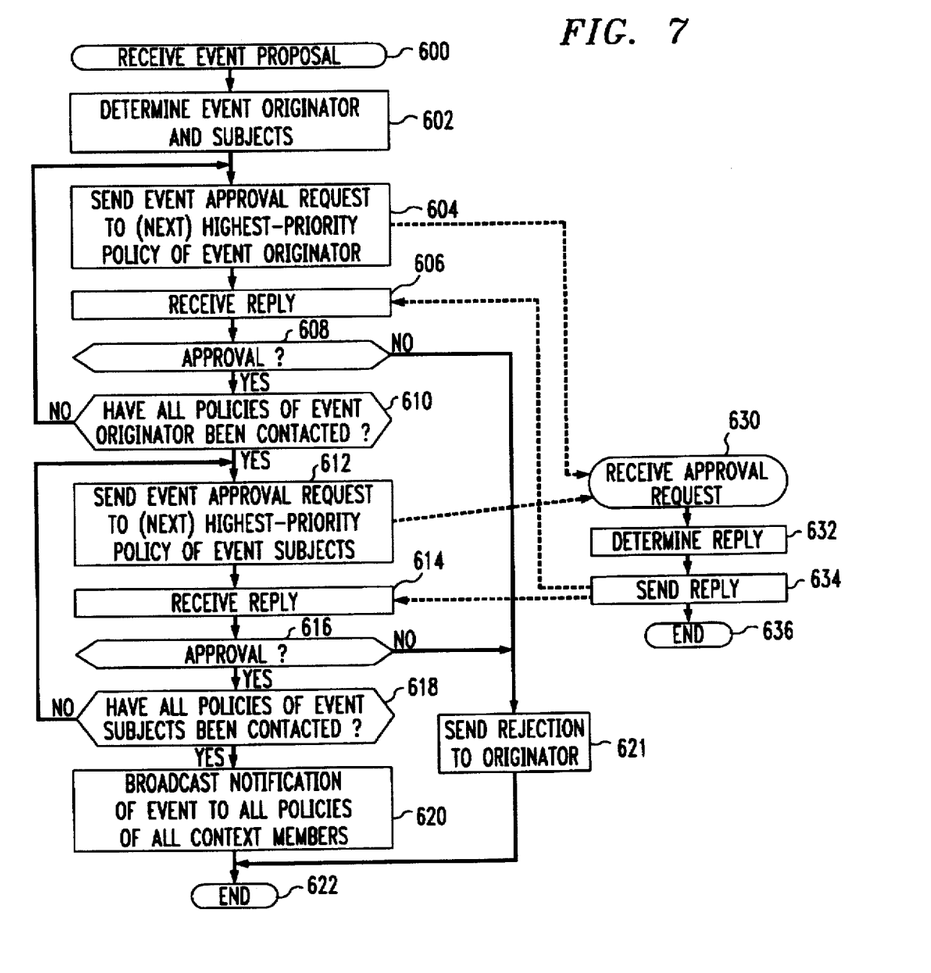
FIG. 7 is a functional flow diagram of an event-negotiation procedure of a context and context members of the model of FIG. 3.

FIG. 7 shows the event-negotiation procedure. When an event proposal is received by context 200 from a policy, at step 600, context 200 determines from the event which context members need to approve the event, at step 602, and then sends event requests for approval to the policies of each member which needs to approve the event—first to the requestor's policies serially and sequentially in the order of the policies' priorities, and then to the policies of the subject or subjects of the request serially and sequentially in the order of the policies' priorities. Context 200 first sends an event-approval request to the highest-priority policy of the event-originator, at step 604. Upon receipt of an event request for approval, at step 630, each policy that is asked for approval of the event executes whatever algorithm it has been programmed with to determine its approval or rejection, at step 632, and sends its reply to context 200, at step 634, before concluding, at step 636. Context receives the policy's reply, at step 606, and checks whether it is an approval or a disapproval, at step 608. If any policy of any member who needs to approve the event replies with a rejection of the event, as determined at step 608, context 200 notifies the policy that made the event proposal, at step 621, then ends, at step 622, and the event is not effected. If the received reply is an approval, context checks whether it has sent an event-approval request to each policy of the event originator, at step 610. If not, context 200 returns to step 604 to send the event-approval request to the next-highest priority policy of the event originator. If all policies of the event originator have been sent event-approval requests, context 200 proceeds to steps 612–618 to repeat the procedure of steps 604–618 for each policy of the event subjects. If all policies of all context members who need to approve the event reply with an acceptance of the event, as determined at step 618, context 200 broadcasts notification of the event to all policies of all members of the context, at step 620, so that the policies can implement, or take note of, the event, and ends, at step 622. The event notifications at step 620 are not prioritized.

Figure 8:
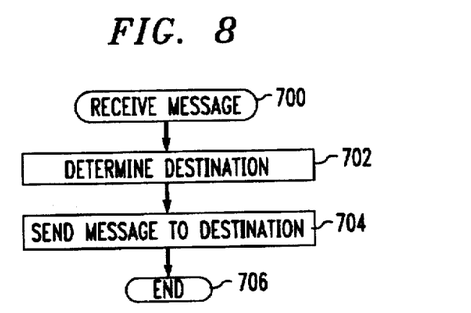
FIG. 8 is a functional flow diagram of a message-passing procedure of the context of the model of FIG. 3.

The policy priorities do not affect information messages, which are data messages or requests for information sent between clients and servers through APIs such as administration API 360, for example. Their handling by APIs is shown in FIG. 8. Upon receiving an information message, at step 700, an API determines the message's destination, at step 702, and forwards the message to that destination, at step 704, before ending, at step 706.

To provide the above-described communications capabilities, the various APIs include the following messages.

To allow an administrator of MMCX system 100 and parties 220–221 at endpoints 101–102 to administer the features, administration API 360 provides a message that comprises one function (command) and three arguments. The function is "administration request". The arguments are the identifier of the feature that is to be administered, the identifier of the party for which the administration is being done, and the administration data for use by the message recipient.

To enable feature managers and service managers to register with context service 120, context API 121 provides a message that comprises one function and four arguments. The function is "policy registration request". The arguments are the identifier of the feature or service, the user policy that is registering (the registrant), the name of the party represented by the registrant, and the registrant's priority.

To enable feature managers and service managers to register with trading service 124, trading API 125 provides a message that comprises one function and two arguments. The function is "manager registration request". The arguments are the identifier of the feature or service that is registering, and the CWID of the registrant.

To enable feature admin. agents and server agents to find suitable user policies and service managers via trading service 124, trading API 125 provides two messages. One message has a function of "server request" from the agent to trading service 124, and arguments of feature or service ID and feature or service parameters being requested by the agent. The other message has a function of "server response" from trading service 124 to the agent, and an argument of CWID of the feature's user policy or the service manager selected by trading service 124.

To enable policies to initiate events, context API 121 provides a message that comprises any one of six functions and four arguments. The functions are "create context", "destroy context", "add member", "drop member", "change state", and "send message". The arguments are the CWID of the initiator, the new state in the case of the "change state" function, the CWID of the event subject for the functions other than "create context" and "destroy context", and the reason for the event.

To enable event requests for approval to be made, context API 121 provides a message that comprises one function and four arguments. The function is "request for approval". The arguments are the function and arguments of the event-initiating message.

To enable event approvals and denials, and notification of denials to event originators, context API 121 provides a message that has one function and one argument. The function is "approval reply". The argument is either approval or a failure code.

To enable event notifications, context API 121 provides a message that comprises one function and four arguments. The function is "event notification". The arguments are the function and arguments of the event-initiating message.

To enable in-context communication among context members, context API 121 provides a message that has one function and four arguments. The function is "send message". The arguments are the CWID of the destination party, the ID of the feature or service being communicated with, the ID of the user policy being communicated with, and the message data. If the policy ID is omitted, the message is sent to all user policies of the identified feature or service.

To allow information-passing between user policies and feature admin. agents, administration API 360 provides a message that comprises one function and one argument. The function is "administer". The argument is an arbitrary data field.

Given this infrastructure, almost anyone can create a feature (that is, feature software) for use therein. Substantially the only requirements placed on the feature software are that (a) it have a client/server construction, that is, be constructed as a feature-manager server module plus a feature admin. agent client module and (b) be compliant with messages of the interfaces (context API 121, administration API 360, and trading API 125 in this example) that were enumerated above, and with their functions. Compliance with requirements (a) and (b) above ensures that the feature can both operate in the system of FIG. 1 and inter-operate with other features and services of the system of FIG. 1. In other respects, the internal structure and functionality of the feature are irrelevant to the system of FIG. 1 and its various components, both hardware and software.

Of course, various changes and modifications to the illustrative embodiment described above will be apparent to those skilled in the art. For example the context service need not be provided by a single server, but may be distributed across a network of servers. Also, the industry-standard Object Management Group's (OMG's) object request broker (ORB) could be used instead of the remote object management (ROM) services and the virtual transport (VT) services. Furthermore, the middleware and its functions could be distributed over a plurality of servers. Also, additional functions and messages may be added to the APIs. Or in addition to, or instead of, the context API protocol, the system can support other multimedia communication protocols (e.g., enhanced H.323, H.320, T.120, conventional audio telephony protocols). Such changes and modifications can be made without departing from the spirit and the scope of the invention and without diminishing its attendant advantages. It is therefore intended that such changes and modifications be covered by the following claims.

The invention claimed is:

1. A call-control apparatus wherein each call feature is implemented as a server program and a cooperating client program, comprising:

means for executing the client and the server programs;
    means for registering for a user an instance of a server program that implements any call feature, in a same manner as any other instances of any server programs that implement any call features, substantially at any time during operation of the call-control apparatus to provide the call feature for the user;
    an administration interface for communicating information, between the server program and a cooperating said client program used by the user, in a same manner as between any other client programs and any server programs that implement any call features, to customize the instance of the server program for the user; and
    means for involving the instance of the server program in a call to which the user is a party, in a same manner as any other instance of any server programs that implement any call features, to provide the feature to the call.

2. The apparatus of claim 1 wherein:

each instance of each server program has a priority associated therewith; and
    the means for involving comprise
    means responsive to occurrence of an event in the call, for giving instances of server programs that are involved in the call each a chance to respond to the event in an order of their associated priorities, to control interaction between the features implemented by the instances of the server programs that are involved in the call.

3. The apparatus of claim 1 wherein the means for involving comprise:
    a second interface for communicating events between a plurality of server programs that are involved in the call, in a same manner as between server programs that are involved in any other calls;
    means cooperative with the second interface, responsive to receipt through the second interface of a proposal of an event from a first server program that is involved in the call, for sending a request for approval of the event through the second interface to the first server program and to a second server program that is also involved in the call;
    means cooperative with the second interface and responsive to receipt through the second interface of approval of the event from both the first and the second server program, for sending the approval of the event through the second interface both to the first server program and to the second server program to cause the event to be effected, and responsive to receipt through the second interface of rejection of the event from either the first or the second server program, for forbearing from sending the approval of the event both to the first server program and to the second server program to prevent the event from being effected.

4. The apparatus of claim 3 wherein:

each server program has a priority associated therewith, and
    the means for sending a request for approval are responsive to the receipt of the event, for sending the request for approval to the first and the second server programs serially in an order of the priorities of the first and the second server programs, to control interaction between the features implemented by the first and the second server programs.

5. The apparatus of claim 4 further comprising:

means for administratively changing the priorities that are associated with server programs, to change the interaction between the features implemented by the server programs.

6. The apparatus of claim 1 wherein:

the administration interface communicates information between the server program and the cooperating client program used by the user to customize a registered said instance of the server program for the user; and
    the involving means involve a customized registered said instance of the server program in the call to which the user is a party.

7. The apparatus of claim 1 wherein:

each feature's server program comprises a plurality of instances of the server program, one for each user who is entitled to the feature.

8. The apparatus of claim 1 wherein:

the executing means comprise
    means for executing the server programs, and at least one means for executing the client programs;

the server programs, the means for executing the server programs, the registering means, and the involving means are included in a call controller;

an instance of the client program of each of at least some of the features and one of said means for executing the client programs are included in each of at least one call endpoint; and the administration interface interfaces the at least one call endpoint with the call controller to communicate information between server programs on the call controller and the instances of the client programs on the at least one endpoint.

9. A method of controlling calls in an apparatus wherein each call feature is implemented as a server program and a cooperating client program and which executes the client and the server programs, comprising the steps of:

in response to a user becoming entitled to a call feature, registering for the user an instance of the server program that implements the call feature, in a same manner as any other instance of any server programs that implement any call features, substantially at any time during operation of the apparatus, to provide the call feature for the user;

in response to the user using the client program, communicating information between the server program and the client program through an administration interface, in a same manner as information is communicated through the administration interface between any other client programs and any server programs that implement any call feature, to customize the instance of the server program for the user; and in response to the user becoming a party to a call, involving the instance of the server program in the call, in a same manner as any other instance of any server programs that implement any call features, to provide the feature to the call.

10. The method of claim 9 wherein:

each instance of each server program has a priority associated therewith; and the step of involving comprises the step of in response to occurrence of an event in the call, giving instances of server programs that are involved in the call each a chance to respond to the event in an order of their associated priorities, to control interaction between the features implemented by the instances of the server programs that are involved in the call.

* * * * *